US00RE45779E

(19) United States
(12) Reissued Patent
Najewicz

(10) Patent Number: US RE45,779 E
(45) Date of Reissued Patent: Oct. 27, 2015

(54) THERMOELECTRIC ICEMAKER AND CONTROL

(71) Applicant: General Electric Company, Schenectady, NY (US)

(72) Inventor: David Joseph Najewicz, Prospect, KY (US)

(73) Assignee: General Electric Company, Schenectady, NY (US)

(21) Appl. No.: 13/762,150

(22) Filed: Feb. 7, 2013

Related U.S. Patent Documents

Reissue of:
(64) Patent No.: 6,735,959
Issued: May 18, 2004
Appl. No.: 10/249,183
Filed: Mar. 20, 2003

U.S. Applications:
(63) Continuation of application No. 11/437,003, filed on May 18, 2006, now Pat. No. Re. 44,132, which is an application for the reissue of Pat. No. 6,735,959.

(51) Int. Cl.
*F25D 3/02* (2006.01)
*F25B 21/02* (2006.01)
*F25C 1/10* (2006.01)

(52) U.S. Cl.
CPC ..... *F25C 1/10* (2013.01)

(58) Field of Classification Search
CPC ..... F25C 2300/00; F25C 5/182; F25C 5/005
USPC ..... 62/420, 424, 425, 456, 340, 344, 353, 62/3.63
See application file for complete search history.

(56) References Cited

U.S. PATENT DOCUMENTS

| | | | | |
|---|---|---|---|---|
| 3,100,970 | A * | 8/1963 | Elfving | 62/3.6 |
| 3,109,970 | A | 11/1963 | Smyltfe et al. | |
| 3,146,601 | A * | 9/1964 | Gould | 62/3.6 |
| 3,146,606 | A | 9/1964 | Grimes et al. | |
| 3,247,682 | A | 4/1966 | Jacobs et al. | |
| 4,003,214 | A * | 1/1977 | Schumacher | 62/340 |
| 4,285,212 | A * | 8/1981 | Prada | 62/344 |
| 4,487,024 | A | 12/1984 | Fletcher et al. | |
| 4,587,810 | A | 5/1986 | Fletcher | |
| 4,644,753 | A * | 2/1987 | Burke | 62/3.6 |
| 4,727,720 | A | 3/1988 | Wernicki | |
| 4,831,840 | A | 5/1989 | Fletcher | |
| 4,872,317 | A * | 10/1989 | Reed | 62/135 |
| 4,916,921 | A | 4/1990 | Fletcher | |
| 5,219,225 | A | 6/1993 | Ball | |
| 5,375,432 | A | 12/1994 | Cur | |
| 5,642,628 | A | 7/1997 | Whipple et al. | |

(Continued)

*Primary Examiner* — Cassey D Bauer
(74) *Attorney, Agent, or Firm* — Global Patent Operation; Douglas D. Zhang

(57) ABSTRACT

In one aspect, an icemaker for making ice in a fresh food compartment of a bottom mount refrigerator is provided. The refrigerator comprises a freezer compartment comprising a freezer door, and a fresh food compartment located over the freezer compartment and comprising a fresh food door. The fresh food door comprises an ice dispenser. An ice maker is located in the fresh food compartment, and the ice maker comprises an ice mold, and a thermoelectric device for moving heat from the ice mold. The mold is positioned so that ice from the mold can be dispensed by the ice dispenser in the fresh food door.

13 Claims, 2 Drawing Sheets

(56) References Cited

U.S. PATENT DOCUMENTS

| | | | | | |
|---|---|---|---|---|---|
| 5,711,159 | A | | 1/1998 | Whipple, III | |
| 5,829,263 | A | * | 11/1998 | Park | 62/177 |
| 5,846,446 | A | | 12/1998 | Jackson | |
| 6,090,281 | A | | 7/2000 | Buckner | |
| 6,091,062 | A | | 7/2000 | Pfahnl et al. | |
| 6,312,608 | B1 | | 11/2001 | Buckner | |
| 6,401,461 | B1 | | 6/2002 | Harrison et al. | |
| 6,464,854 | B2 | | 10/2002 | Andrews et al. | |
| 6,464,857 | B2 | | 10/2002 | Miller | |
| 2002/0121096 | A1 | | 9/2002 | Harrison et al. | |
| 2002/0124576 | A1 | | 9/2002 | Loibl et al. | |

* cited by examiner

THERMOELECTRIC ICEMAKER AND CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED REISSUE APPLICATIONS*

*More than one reissue application has been filed for the reissue of U.S. Pat. No. 6,735,959. The reissue applications are the initial reissue application Ser. No. 11/437,003 filed May 18, 2006 and a continuation reissue application Ser. No. 13/762,150, filed Feb. 7, 2003.*

*CROSS-REFERENCE TO RELATED APPLICATION*

*This application is a continuation reissue of application Ser. No. 11/437,003, filed May 18, 2006, which is an application for reissue of U.S. Pat. No. 6,735,959.*

BACKGROUND OF INVENTION

This invention relates generally to refrigerators and more particularly, to icemakers for bottom mount freezer type refrigerators.

Refrigerators and freezers typically include an icemaker. The icemaker receives water for ice production from a water valve typically mounted to an exterior of the refrigerator or freezer case. The water valve typically is coupled to a fill tube via polyethylene tubing. Water is dispensed from the fill tube into a tray in which ice cubes are formed. Specifically, the fill tube transports water from the polyethylene tubing to the icemaker located inside the freezer. The fill tube typically is either foamed in place or extends through an opening in the case.

A bottom mount type refrigerator includes a freezer compartment and a fresh food compartment. The freezer compartment is located below the fresh food portion, and generally, the temperature in the freezer compartment is intended to be maintained below the freezing point of water. The temperature in the fresh food compartment is intended to be maintained at a higher temperature than the temperature in the freezer compartment, and generally, above the freezing temperature of water. Specifically, the temperature in the fresh food compartment generally is not sufficiently cold to freeze items or to form ice.

Even though the temperature in the fresh food compartment is not sufficient to form ice, it would be desirable to have ice and chilled water service through the fresh food door of a bottom mount freezer type of refrigerator. Due to the location of the freezer (i.e., below the fresh food compartment), moving ice upward from the bottom freezer compartment to the door of the fresh food compartment would be difficult and not very practical. Also, since the fresh food compartment temperature is above the freezing point, ice cannot be made in the fresh food compartment.

SUMMARY OF INVENTION

In one aspect, an icemaker for making ice in a fresh food compartment of a bottom mount refrigerator is provided. The refrigerator comprises a freezer compartment comprising a freezer door, and a fresh food compartment located over the freezer compartment and comprising a fresh food door. The fresh food door comprises an ice dispenser. An ice maker is located in the fresh food compartment, and the ice maker comprises an ice mold, and a thermoelectric device for moving heat from the ice mold. The mold is positioned so that ice from the mold can be dispensed by the ice dispenser in the fresh food door.

A freezer air duct extends from the freezer compartment to the ice mold. An air flow control device is provided for controlling flow of freezer air through the freezer air duct. In addition, a controller is coupled to the flow control device and to a temperature measurement device positioned to be in an air stream leaving the thermoelectric device. The controller monitors a temperature of air flow from the thermoelectric device. When the temperature of air flow from the thermoelectric device is above a predetermined temperature, air flow through the freezer air duct is increased. When the temperature of air flow from the thermoelectric device is below a predetermined temperature, then air flow through the freezer air duct is decreased.

In another aspect, an ice mold having an enhanced heat transfer surface and located in a fresh food compartment of a bottom mount refrigerator is provided. The refrigerator comprises a freezer compartment comprising a freezer door, and a fresh food compartment located over the freezer compartment and comprising a fresh food door. The fresh food door comprises an ice dispenser. An ice maker is located in the fresh food compartment, and the ice maker comprises the ice mold with the enhanced heat transfer surface. A freezer air duct extends from the freezer compartment to the ice mold, and an air flow control device is provided for controlling flow of freezer air through the freezer air duct. A fan is located near the ice mold and the fan augments the movement of the freezer air.

A controller is coupled to the flow control device, the fan near the ice mold, and to a temperature measurement device positioned to be in an air stream leaving the thermoelectric device. The controller monitors a temperature of air flow from the thermoelectric device. When the temperature of air flow from the thermoelectric device is above a predetermined temperature, air flow through the freezer air duct over the ice mold is increased. When the temperature of air flow from the thermoelectric device is below a predetermined temperature, then air flow through the freezer air duct and over the ice mold is decreased.

DETAILED DESCRIPTION

Icemakers are utilized in residential, or domestic, refrigerators as well as in stand alone freezers. Users generally find it convenient to have ice dispensed through the refrigerator door. Such convenience can be readily provided with side-by-side and top mount refrigerator types. However, with bottom mount refrigerator types, moving ice formed in the freezer compartment upward to be dispensed through the fresh food compartment door is difficult, as well as not practical, in many, if not all, circumstances.

Set forth below is a description of an icemaker configuration that enables dispensing ice through the fresh food compartment door of a bottom mount refrigerator. In one specific embodiment, a thermoelectric device is used to make ice in the fresh food compartment. Thermoelectric icemakers are well known and commercially available. In the one specific embodiment, a freezer air duct extends from the freezer compartment and into the fresh food compartment, and a small stream of air from the freezer compartment acts as a coolant for the heat rejected from the thermoelectric device. In the example embodiment, the freezer air performs multiple functions including cooling an ice storage container, cooling the thermoelectric device and also for controlling the temperature of the fresh food compartment.

Figure 1:
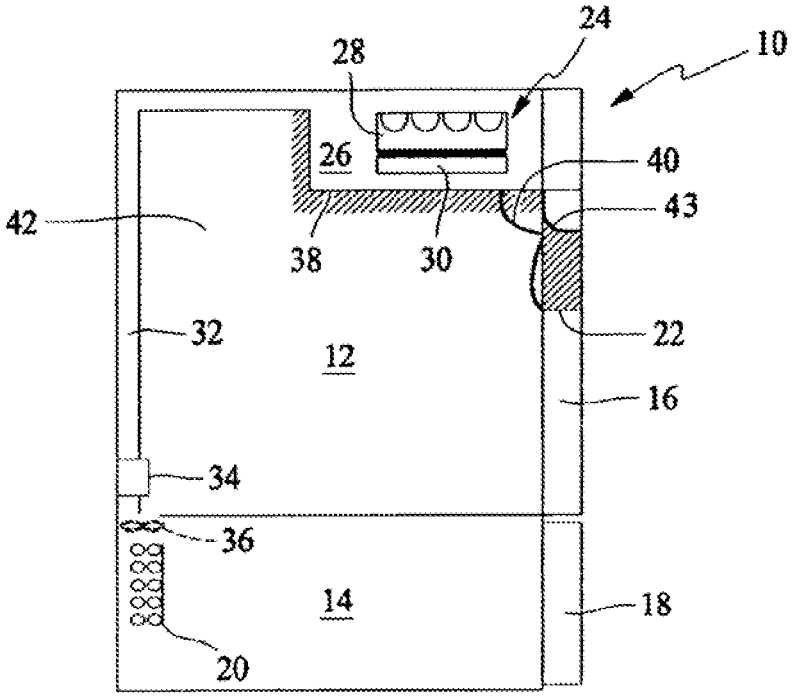
FIG. 1 is a schematic illustration of a bottom mount refrigerator.

Referring to the drawings, FIG. 1 is a schematic illustration of a bottom mount refrigerator 10. Refrigerator 10 includes a fresh food compartment 12 and a freezer compartment 14. A fresh food door 16 closes fresh food compartment 12, and a freezer door 18 closes freezer compartment 14. An evaporator 20 is located in freezer compartment 14, and cold air from evaporator 20 cools freezer compartment 14. An ice/cold water dispenser 22 is located in fresh food door 16. As described below in more detail, such dispenser 22 is in flow communication with an ice maker 24 located in a section 26 of fresh food compartment 12.

More specifically, ice maker 24 includes an ice mold 28 and a thermoelectric device 30 for moving heat from ice mold 28. Mold 28 is positioned so that ice from mold 28 can be dispensed by ice dispenser 22 in fresh food door 16.

A freezer air duct 32 extends from freezer compartment 14 to ice mold 28. An air flow control device 34 controls flow of freezer air through freezer air duct 32. Flow control device 34, in one embodiment, is a damper movable between a full closed position and a fully open position. In another embodiment, flow control device 34 is a variable speed fan 36 (shown in phantom in FIG. 1).

Mold 28 and thermoelectric device 30 are located in section 26 of fresh food compartment 12 formed by a wall 38. Wall 38 includes an opening 40 through which air from device 30 can flow into a section 42 of fresh food compartment in which food can be stored. An insulated container (not shown) into which ice from mold 28 is dispensed also is in flow communication with section 26, and the container also would be in communication with ice dispenser 22 in fresh food door 16. Alternatively, ice from mold 28 can be provided directly to dispenser 22 via an opening 43 in door 16.

Figure 2:
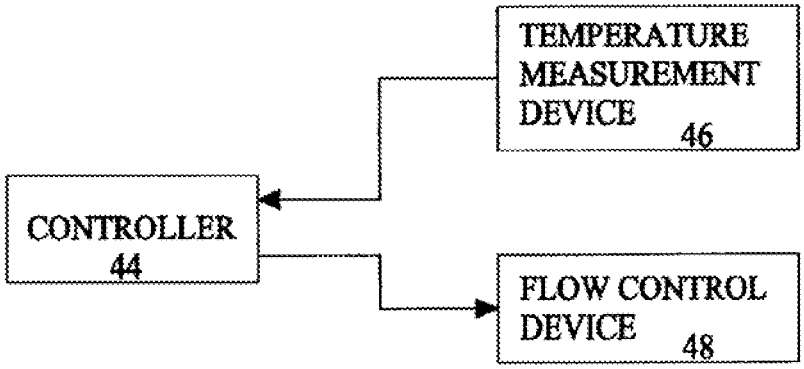
FIG. 2 is a lock diagram of bottom mount refrigerator control circuit.

Referring to FIG. 2, a controller 44 is coupled to a temperature measurement device 46 and to a flow control device 48. Temperature measurement device 46 is positioned within section 26 and in an air stream/flow from thermoelectric device 30 to generate a signal representative of the air flow from device 30. In addition, controller 44 is coupled to a flow control device 48 to control the air flow through duct 32.

Controller 44 is, for example, a programmable microprocessor or an application specific integrated circuit (ASIC). Controller 44 can, however, be any circuit capable of controlling device 46 and device 48 as explained below (e.g., an analog circuit) and need not necessarily be a microprocessor or an ASIC. Temperature measurement device 46 is, for example, a thermocouple or a thermister. Device 46 can, however, be any device capable of generating a signal representative of the air stream/flow from device 30. Flow control device 48 is, for example, a damper or a fan (e.g., damper 34 or variable speed fan 36). Device 48 can, however, by any device capable of controlling air flow through duct 32.

Controller 44 is programmed to control a temperature of air flowing from thermoelectric device 30 to be within a preselected range by controlling freezer air flow through freezer air duct 32. More specifically, controller 44 monitors a temperature of air flow from thermoelectric device 30 by monitoring the signal generated by device 46. When the temperature of air flow from thermoelectric device 30 is above a predetermined temperature, controller 44 increases the air flow through freezer air duct 32 by operating device 48 to allow greater air flow (e.g., further opening the damper and/or increasing the speed of the fan). When the temperature of air flow from thermoelectric device 30 is below a predetermined temperature, controller 44 then decreases the air flow through freezer air duct 32 by operating device 48 to decrease such flow (e.g., further closing the damper and/or decreasing the speed of the fan).

In addition for controlling air temperature as described above, controller 44 is programmed to facilitate the ejection of ice cubes from mold 28. Specifically, controller 44 controls thermoelectric device so that once ice cubes are formed, device 30 briefly operates to heat mold 28 to facilitate dispensing ice therefrom.

As explained above, by mounting a thermoelectric device in contact with an ice mold in the fresh food section of a bottom mount refrigerator, ice is formed in the fresh food compartment of a bottom mount refrigerator, despite the fact that the air temperature is above freezing temperature. Once ice is formed, the thermoelectric device can be operated in reverse (reverse polarity) to heat the ice mold and allow the removal of the ice without the use of an external heater. Once frozen, the ice can be either stored in an insulated container or fed directly to the ice delivery mechanism.

As explained above, the freezer air performs multiple functions including cooling an ice storage container, cooling the thermoelectric device and also for controlling the temperature of the fresh food compartment. The multiple uses of the freezer air stream is accomplished by, in one embodiment, microprocessor control of the air flow rate through the freezer air duct to satisfy the demands of the thermoelectric device and the cooling demands of the fresh food compartment. Further, and rather than directly injecting the heat from the thermoelectric device directly into the fresh food air, which would cause the temperature of the fresh food section to rise and require a large volume of air flow to cool the thermoelectric device, a small flow of air (e.g., 1-2 CFM) from the freezer compartment is provided to flow through the ice storage section of the icemaker, continue over the rejected heat side of the thermoelectric device, absorbing the rejected heat, and exit into fresh food section of the fresh food compartment.

Variations to the above described embodiment are possible. For example, in another embodiment, an ice mold with an enhanced heat transfer surface is used rather than a thermoelectric device. Enhancing a heat transfer surface to improve the transfer of heat is well known in the art. In addition, a variable speed fan can be located near the ice mold to augment freezer air flow over the mold. The controller is coupled to the flow control device and to the temperature measurement device, as described above, and also to the fan near the ice mold. When the temperature of air flow from the thermoelectric device is above a predetermined temperature, air flow through the freezer air duct and over the ice mold is increased. When the temperature of air flow from the thermoelectric device is below a predetermined temperature, then air flow through the freezer air duct and over the ice mold is decreased.

Also, the icemaker could be located in a drawer in the fresh food compartment and need not be in communication with an ice dispenser in the fresh food compartment door. The icemaker could be at many different locations within the fresh food compartment. The icemaker could, for example, be mounted within the fresh food compartment door itself with the ice being dispensed through the door.

Figure 3:
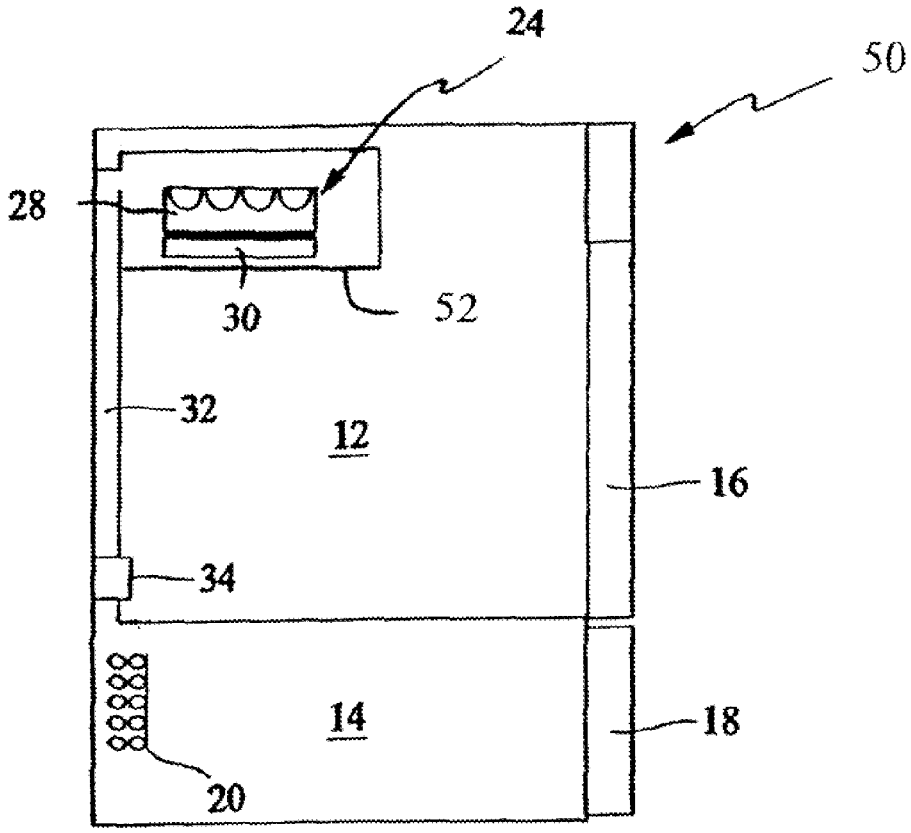
FIG. 3 is schematic illustration of another bottom mount refrigerator.

FIG. 3 is a schematic illustration of a refrigerator 50. Refrigerator 50 like refrigerator 10 described above, includes fresh food compartment 12 and freezer compartment 14. Fresh food door 16 closes fresh food compartment 12, and freezer door 18 closes freezer compartment 14. Evaporator 20 is located in freezer compartment 14, and cold air from evaporator 20 cools freezer compartment 14. Ice maker 24 is positioned in a drawer 52 located in fresh food compartment 12. Ice maker 24 includes ice mold 28 and thermoelectric device 30 for moving heat from ice mold 28. Freezer air duct 32 extends from freezer compartment 14 to ice mold 28 in drawer 50. Air flow control device 34 controls flow of freezer air through freezer air duct 32.

While the invention has been described in terms of various specific embodiments, those skilled in the art will recognize that the invention can be practiced with modification within the spirit and scope of the claims.

What is claimed is:

[1. A bottom mount refrigerator, comprising:

a freezer compartment comprising a freezer door;

a fresh food compartment located over said freezer compartment and comprising a fresh food door, said fresh food door comprising an ice dispenser; and an ice maker in said fresh food compartment, said ice maker comprising an ice mold, and a thermoelectric device for moving heat from said ice mold, said mold positioned so that ice from said mold can be dispensed by said ice dispenser in said fresh food door.]

[2. A bottom mount refrigerator in accordance with claim 1 further comprising a freezer air duct extending from said freezer compartment to said ice mold.]

[3. A bottom mount refrigerator in accordance with claim 2 further comprising an air flow control device for controlling flow of freezer air through said freezer air duct.]

[4. A bottom mount refrigerator in accordance with claim 3 wherein said air flow control device comprises a damper in said freezer air duct.]

[5. A bottom mount refrigerator in accordance with claim 3 wherein said air flow control device comprises a variable speed fan for moving air from said freezer compartment into and through said freezer air duct.]

[6. A bottom mount refrigerator in accordance with claim 1 further comprising an insulated container into which ice from said mold is dispensed, and wherein said insulated container is in communication with said ice dispenser in said fresh food door.]

[7. A bottom mount refrigerator in accordance with claim 1 further comprising a controller, a flow control device for controlling flow of freezer air through said freezer air duct, and a temperature measurement device positioned to be in an air stream leaving said thermoelectric device, said controller coupled to said flow control device and to said temperature measurement device.]

[8. A bottom mount refrigerator in accordance with claim 7 wherein said controller is programmed to control a temperature of air from said thermoelectric device to be within a pre-selected range by controlling freezer air flow through said freezer air duct.]

[9. A bottom mount refrigerator in accordance with claim 8 wherein said controller is coupled to said thermoelectric device and is further programmed to operate said thermoelectric device to selectively heat said mold to facilitate dispensing ice from said mold.]

[10. An icemaker for making ice in a fresh food compartment of a bottom mount refrigerator, the refrigerator further including a freezer compartment and a freezer air duct extending from the freezer compartment into the fresh food compartment, said icemaker comprising:

an ice mold configured to be positioned in the fresh food compartment and in flow communication with the freezer air duct;

a thermoelectric device for moving heat from said ice mold; and an air flow control device for controlling flow of freezer air through the freezer air duct.]

[11. An icemaker in accordance with claim 10 wherein said air flow control device comprises a damper in said freezer air duct.]

[12. An icemaker in accordance with claim 10 wherein said air flow control device comprises a variable speed fan for moving air from the freezer compartment into and through the freezer air duct.]

[13. An icemaker in accordance with claim 10 further comprising an insulated container into which ice from said mold is dispensed, and wherein said insulated container is in communication with an ice dispenser in a fresh food compartment door.]

[14. An icemaker in accordance with claim 10 further comprising a controller for controlling said flow control device.]

[15. An icemaker in accordance with claim 14 further comprising a temperature measurement device positioned to be in an air stream leaving said thermoelectric device, said controller coupled to said temperature measurement device and programmed to control a temperature of air from said thermoelectric device to be within a pre-selected range.]

[16. An icemaker in accordance with claim 14 wherein said controller is further programmed to operate said thermoelectric device to selectively heat said mold to facilitate dispensing ice from said mold.]

[17. A method for operating an icemaker in a fresh food compartment of a bottom mount refrigerator, the icemaker comprising an ice mold configured to be positioned in the fresh food compartment and in flow communication with a freezer air duct, a thermoelectric device for moving heat from the ice mold, and an air flow control device for controlling flow of freezer air through the freezer air duct, said method comprising the steps of:

monitoring a temperature of air flow from the thermoelectric device, when the temperature of air flow from the thermoelectric device is above a predetermined temperature, increasing the air flow through the freezer air duct, and when the temperature of air flow from the thermoelectric device is below a predetermined temperature, then decreasing the air flow through the freezer air duct.]

[18. A method according to claim 17 wherein the air flow control device is a damper, and wherein increasing the air flow through the freezer air duct comprises moving the damper toward a fully open position and wherein decreasing the air flow through the freezer air duct comprises moving the damper toward a fully closed position.]

[19. A method according to claim 17 wherein the flow control device comprises a variable speed fan, and wherein increasing the air flow through the freezer air duct comprises operating the fan at a faster speed, and wherein decreasing the air flow through the freezer air duct comprises operating the fan at a slower speed.]

[20. A method according to claim 17 further comprising the step of operating the thermoelectric device to selectively heat the mold to facilitate dispensing ice from the mold.]

[21. A bottom mount refrigerator, comprising:

a freezer compartment comprising a freezer door;

a fresh food compartment located over said freezer compartment and comprising a fresh food door, said fresh food door comprising an ice dispenser;

an ice maker in said fresh food compartment, said ice maker comprising an ice mold, said mold positioned so that ice from said mold can be dispensed by said ice dispenser in said fresh food door; and a fan for moving air from said freezer compartment over said ice mold.]

[22. A bottom mount refrigerator in accordance with claim 21 further comprising a freezer air duct extending from said freezer compartment to said ice mold.]

[23. A bottom mount refrigerator in accordance with claim 22 further comprising an air flow control device for controlling flow of freezer air through said freezer air duct.]

[24. A bottom mount refrigerator in accordance with claim 23 wherein said air flow control device comprises at least one of a damper in said freezer air duct and a variable speed fan for moving air from said freezer compartment into and through said freezer air duct.]

[25. A bottom mount refrigerator in accordance with claim 21 further comprising a controller, a flow control device for controlling flow of freezer air through said freezer air duct, and a temperature measurement device positioned to be in an air stream leaving a thermoelectric device, said controller coupled to said flow control device, to said temperature measurement device, and to said fan.]

[26. A refrigerator, comprising:

a freezer compartment;

a fresh food compartment;

an ice maker in said fresh food compartment, said ice maker comprising an ice mold; and a drawer located within said fresh food compartment, said ice mold positioned in said drawer.]

[27. A refrigerator according to claim 26 wherein said icemaker further comprises a thermoelectric device for moving heat from said ice mold.]

[28. A refrigerator according to claim 26 wherein said mold comprises a heat transfer surface.]

*29. A bottom mount refrigerator comprising:*

*a freezer compartment;*

*a freezer door configured to close the freezer compartment;*

*a fresh food compartment located over the freezer compartment;*

*a fresh food door configured to close the fresh food compartment;*

*an insulated third compartment located within the fresh food compartment;*

*a temperature measurement device located within the insulated third compartment;*

*an ice maker mounted in the insulated third compartment and comprising an ice mold;*

*a freezer air duct extending from the freezer compartment to the ice mold; and*

*an air flow control device for controlling flow of freezer air through the freezer air duct, wherein the air flow control device comprises a variable speed fan for moving freezer air from the freezer compartment into and through the freezer air duct.*

*30. The bottom mount refrigerator of claim 29, wherein the air flow control device further comprises a damper in the freezer air duct.*

*31. The bottom mount refrigerator of claim 29, further comprising a controller coupled to the air flow control device and to the temperature measurement device.*

*32. The bottom mount refrigerator of claim 31, wherein the controller is programmed to control a temperature of air from the insulated third compartment to be within a pre-selected range by controlling freezer air flow through the freezer air duct via the air flow control device based on a signal from the temperature measurement device.*

*33. The bottom mount refrigerator of claim 29, wherein the temperature measurement device comprises a thermocouple or a thermistor.*

*34. The bottom mount refrigerator of claim 29, further comprising an ice storage section configured to receive ice from the ice mold.*

*35. The bottom mount refrigerator of claim 29, wherein the fresh food door comprises an ice dispenser, and wherein the ice mold is positioned so that ice from the ice mold can be dispensed by the ice dispenser in the fresh food door.*

*36. A bottom mount refrigerator comprising:*

*a freezer compartment;*

*a freezer door configured to close the freezer compartment;*

*a fresh food compartment located over the freezer compartment;*

*a fresh food door configured to close the fresh food compartment, the fresh food door comprising an ice dispenser;*

*an insulated third compartment located within the fresh food compartment;*

*a temperature measurement device positioned within the insulated third compartment;*

*an ice maker located in the insulated third compartment, the ice maker comprising an ice mold and an ice storage section configured to receive ice dispensed from the ice mold, the ice storage section being in communication with the ice dispenser;*

*a freezer air duct providing communication between the freezer compartment and the ice storage section, a flow of air from the freezer compartment provided to flow through the ice storage section and exit into the fresh food compartment; and*

*an air flow control device for controlling flow of freezer air through the freezer air duct.*

*37. The bottom mount refrigerator of claim 36, wherein the air flow control device comprises a damper in the freezer air duct.*

*38. The bottom mount refrigeration of claim 36, wherein the air flow control device comprises a variable speed fan for moving air from the freezer compartment into and through the freezer air duct.*

*39. The bottom mount refrigerator of claim 36, further comprising a controller coupled to the air flow control device and to the temperature measurement device.*

*40. The bottom mount refrigerator of claim 39, wherein the controller is programmed to control a temperature of air from the insulated third compartment to be within a pre-selected range by controlling freezer air flow through the freezer air duct via the air flow control device based on a signal from the temperature measurement device.*

*41. The bottom mount refrigerator of claim 36, wherein the temperature measurement device comprises a thermocouple or a thermistor.*

* * * * *